Oct. 18, 1932.   L. L. TURNER   1,883,834
MIRROR SUPPORT
Filed Jan. 30, 1932   2 Sheets-Sheet 1
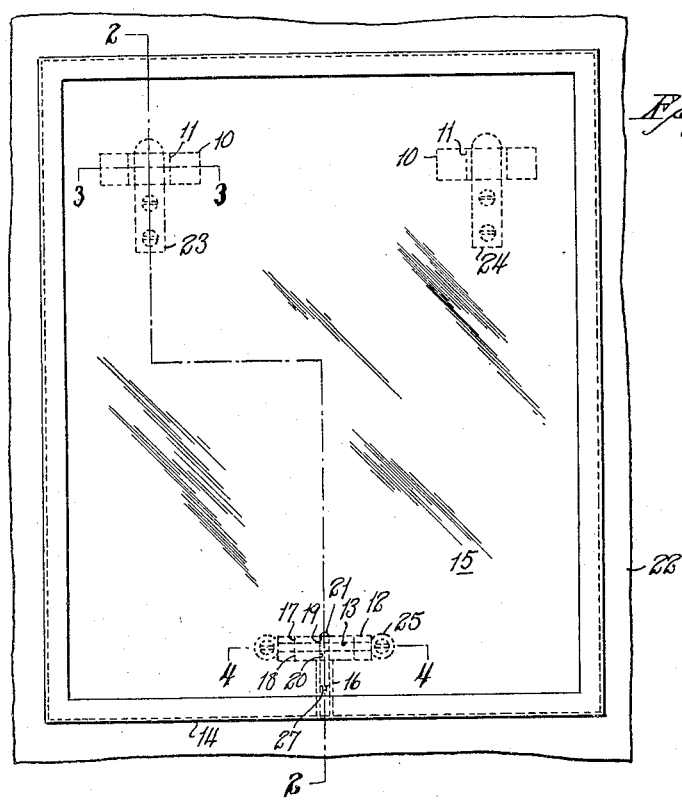
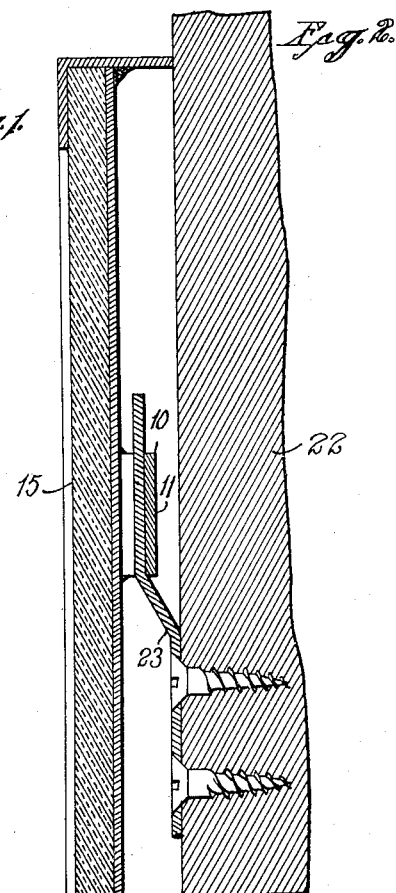
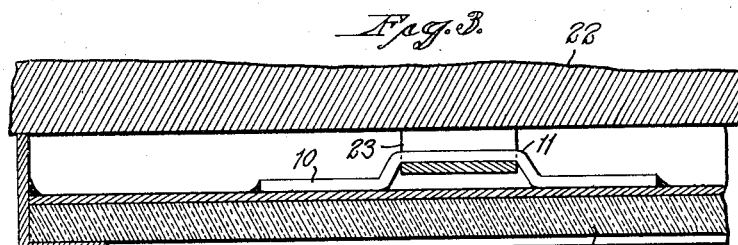
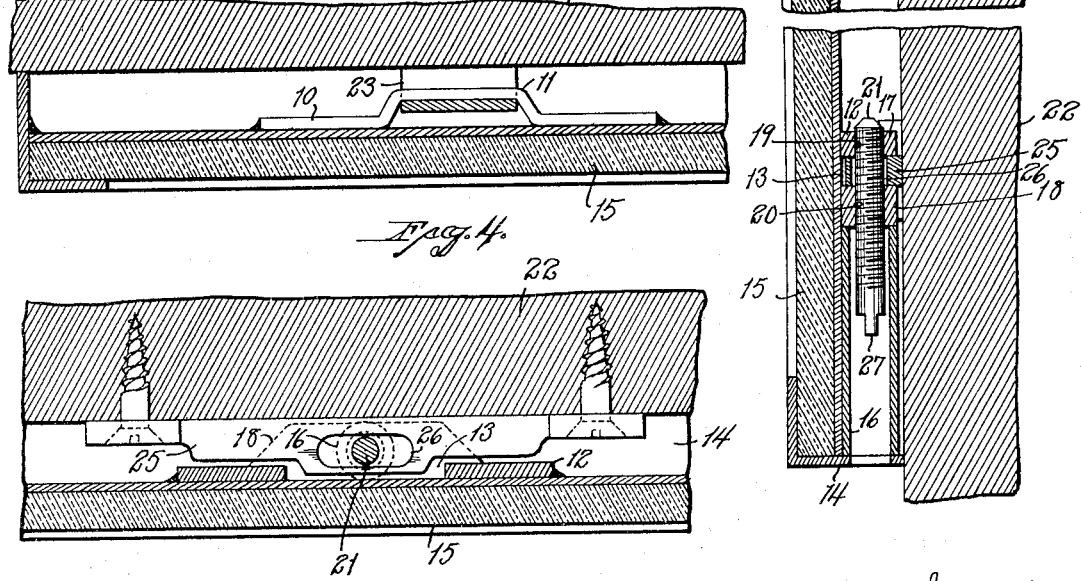
Inventor.
Lewis R. Turner
Seymour Earle & Nichols
Attys Oct. 18, 1932.  L. L. TURNER  1,883,834
MIRROR SUPPORT
Filed Jan. 30, 1932  2 Sheets-Sheet 2

Patented Oct. 18, 1932

1,883,834

UNITED STATES PATENT OFFICE

LEWIS L. TURNER, OF SOUTH MERIDEN, CONNECTICUT, ASSIGNOR TO THE CHARLES PARKER COMPANY, OF MERIDEN, CONNECTICUT, A CORPORATION

MIRROR-SUPPORT

Application filed January 30, 1932. Serial No. 589,861.

This invention relates to an improvement in mirror-supports, the object being to provide means for locking a mirror to a wall or other support, so that it cannot be surreptitiously removed.

The invention consists in the construction as hereinafter described and particularly recited in the claims.

In the accompanying drawings:

Fig. 1 is a front view of a mirror-support constructed in accordance with my invention;

Fig. 2 is a sectional view on the line 2—2 of Fig. 1;

Fig. 3 is a sectional view on the line 3—3 of Fig. 1, enlarged;

Fig. 4 is a sectional view on the line 4—4 of Fig. 1, enlarged;

Figure 5:
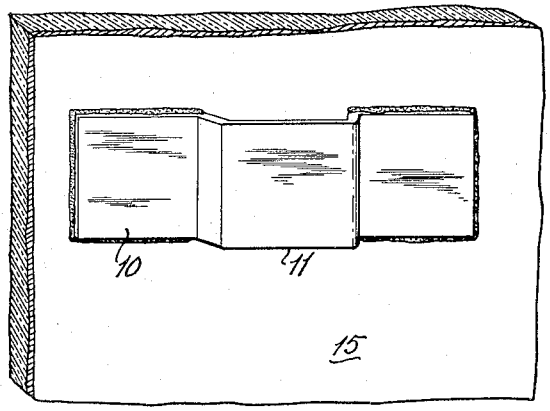
Fig. 5 is a broken view of the rear of the mirror, showing one of the straps.
Figure 6:
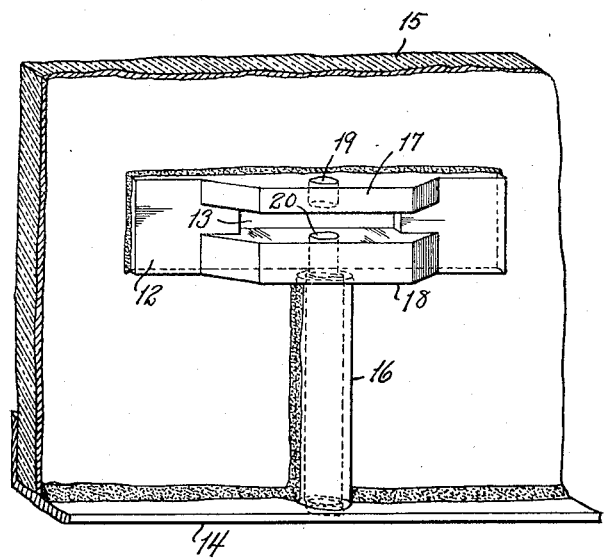
Fig. 6 is a broken perspective view of the lower portion of the mirror, illustrating the locking-block.
Figure 7:
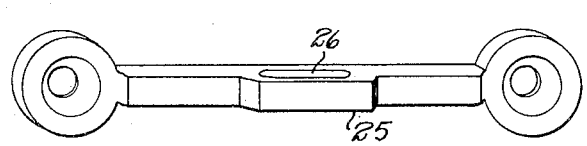
Fig. 7 is a perspective view of the locking-bar, detached.

In carrying out my invention, I provide the mirror, near its upper end and preferably near each side, with a strap 10 having outset centers 11, and near the lower edge with a centrally-arranged locking-block 12, formed with a transverse slot 13, and between the block and the lower edge 14 of the frame which projects rearward beyond the rear of the mirror 15, I mount a guide 16, and through the two portions 17 and 18 of the block formed by the slot 13 are threaded openings 19 and 20, aligned with the guide 16, and extending upward through the lower edge of the frame is a screw 21 threaded to fit the openings 19 and 20.

Secured to the wall 22 or other support for the mirror are hooks 23 and 24 in position to be engaged by the straps 10, and secured to the wall or other support and below the hooks 23 and 24 is a locking-bar 25 adapted to enter the groove 13 and this is formed with a centrally-arranged clearance-slot 26 through which the screw may pass.

To mount the mirror, the straps 10 are engaged with the hooks 23 and 24 and the locking-bar is entered into the slot 13 of the locking-block 12. The screw 21 is then turned upward so as to pass through the hole 20, through the slot 26 and into the hole 19. This screw may have its outer end formed with an angular projection 27 so that it may be turned by a specially-formed key, or the screw may have the usual kerf, whereby it may be turned by a regular screw driver. In either case, the screw cannot readily be withdrawn, and until it is withdrawn, the mirror cannot be detached.

It is obvious without illustration that the locking-block 12 might be secured to the wall or support and the locking-bar secured to the back of the frame.

This device is particularly adapted for use in hotels and other public places from which mirrors may be maliciously removed.

I claim:

1. A mirror-support comprising a hook adapted to be secured to the surface on which the mirror is to be mounted, a bar secured to said surface, a strap mounted on the back of the mirror and adapted to engage said hook, a locking-block also secured to the back of the mirror and formed with a slot to receive the bar on the supporting-surface, said block formed with vertically-arranged threaded-openings, and a screw adapted to extend through said openings and bar to interlock them.

2. A mirror-support comprising a hook adapted to be secured to the surface on which the mirror is to be mounted, a bar secured to said surface and formed with a transverse slot, a strap mounted on the back of the mirror and adapted to engage said hook, a locking-block also secured to the back of the mirror and formed with a slot to receive the said bar, said block formed with vertically-arranged threaded-openings, a guide between the locking-block and the edge of the mirror, and a screw extending upward through said bar and block, whereby the bar and block are interlocked.

In testimony whereof, I have signed this specification.

LEWIS L. TURNER.